United States Patent [19]

Johnson et al.

[11] 4,401,403
[45] Aug. 30, 1983

[54] SPOUT CONTROL SYSTEM

[75] Inventors: Stanley J. Johnson, Cedar Falls; David T. Allen; Keith R. Baker, both of Waterloo, all of Iowa

[73] Assignee: Deere & Company, Moline, Ill.

[21] Appl. No.: 282,364

[22] Filed: Jul. 13, 1981

[51] Int. Cl.³ ............................................. B65G 67/22
[52] U.S. Cl. .................................................... 414/335
[58] Field of Search ........................ 414/334, 335, 345

[56] References Cited

U.S. PATENT DOCUMENTS

| 769,916 | 9/1904 | Pfatischer . |
|---|---|---|
| 2,151,793 | 3/1939 | Patin . |
| 2,232,982 | 2/1941 | Tank . |
| 2,294,210 | 8/1942 | Roters . |
| 3,144,146 | 8/1964 | Strickland, Jr. . |
| 3,166,204 | 1/1965 | deBuhr . |
| 3,260,478 | 7/1966 | Welti . |
| 3,431,475 | 3/1969 | Wesner . |
| 3,631,328 | 12/1971 | Borst et al. . |
| 3,662,243 | 5/1972 | Cavil et al. . |
| 3,663,881 | 5/1972 | Ehrenfried et al. . |
| 3,786,945 | 1/1974 | Symonds . |
| 4,042,132 | 8/1977 | Bohman et al. . |

OTHER PUBLICATIONS

Fink, ed., Electronics Engineers Handbook, 1975 edition, pp. 17-41 to 17-44, Sections 103-106, and pp. 10-13, Section 25.

Primary Examiner—Robert G. Sheridan

[57] ABSTRACT

An automatic control system operates to control the spout position on a forage harvester as a function of the position of a crop-receiving wagon and as a function of the relative spout-wagon position. The system includes wagon and spout angle sensors and a variable gain error amplifier for generating an error signal representing the difference therebetween. The gain of the error amplifier is modified according to changes in the wagon position to provide a wagon position dependent amount of free play in the spout-wagon relative position.

19 Claims, 4 Drawing Figures

SPOUT CONTROL SYSTEM

BACKGROUND OF THE INVENTION

This invention relates to an improved control system for controlling the position of a crop discharge spout on an agricultural machine having a crop-receiving wagon pivotally attached thereto.

Automatic systems have been proposed to automatically control forage harvester spout position to prevent crop spillage. One such system is described in U.S. Pat. No. 3,786,945. The '945 system is complicated in that it requires an excitation signal generator and transmitter, signal coils and a phase detector. Another automatic system, which includes light-emitting diodes and photo transistors, is described in U.S. Pat. No. 4,042,132. Both systems provide for accurate tracking of the spout to within a narrow angle range with respect to the crop-receiving wagon when turns are being executed. However, neither system automatically provides for a wider amount of free play between the spout and the wagon during straight line travel so that the operator can manually control the spout to obtain uniform wagon filling while the automatic control system is still operative as a backup. The '132 patent discloses a mechanical idler, but this mechanical idler provides free play only between the wagon and the wagon-machine angle sensor and thus reduces the sensitivity of the wagon-machine angle sensor. This prevents the '132 control system from moving the spout to make the spout-wagon misalignment less than the amount of free play provided by the mechanical idler. Furthermore, the free play provided by the mechanical idler does not vary according to the wagon-machine angle. Instead, the idler free play is constant over all wagon-machine angles. Finally, in order to change between the manual and automatic control modes, the operator of the '132 system is required to first actuate a mode select switch.

SUMMARY OF THE INVENTION

An advantage of the present invention is that it provides an automatic spout control system which permits the operator to manually move the spout through a wide angle range to obtain uniform wagon filling during straight travel without deactivating the automatic control system.

A further advantage of the present invention is that it provides an automatic spout control system with a variable sensitivity which depends upon the wagon position.

A further advantage of the present invention is that it provides an automatic spout control system which automatically switches to high and low sensitivity modes at high and low wagon-machine angles, respectively.

Another advantage of the present invention is that it provides for automatic control of spout-wagon alignment with variable maximum misalignment thresholds.

Another advantage of the present invention is that it provides an automatic spout control system which can correct spout-wagon misalignment to a substantially smaller amount than the amount of misalignment originally required to trigger a spout position correction.

A further advantage of the present system is that it includes fault-sensitive circuits which limit the possible motions of the spout which might otherwise be produced by the control system in response to such fault conditions.

These and other advantages are achieved, by the applicants' invention, which includes potentiometric spout-machine and wagon-machine angle sensors. An automatic control circuit includes a variable gain differential amplifier which generates an error signal representing a difference between these angles. The gain of the differential amplifier is varied in response to changes in the wagon-machine angle. Level comparators with hysteresis actuate a conventional electrohydraulic spout rotating mechanism depending upon the magnitude of the error signal. The automatic control circuit and a manual directional control switch module are both permanently and continuously connected to the inputs of the conventional electrohydraulic spout rotating system.

DETAILED DESCRIPTION

Figure 1:
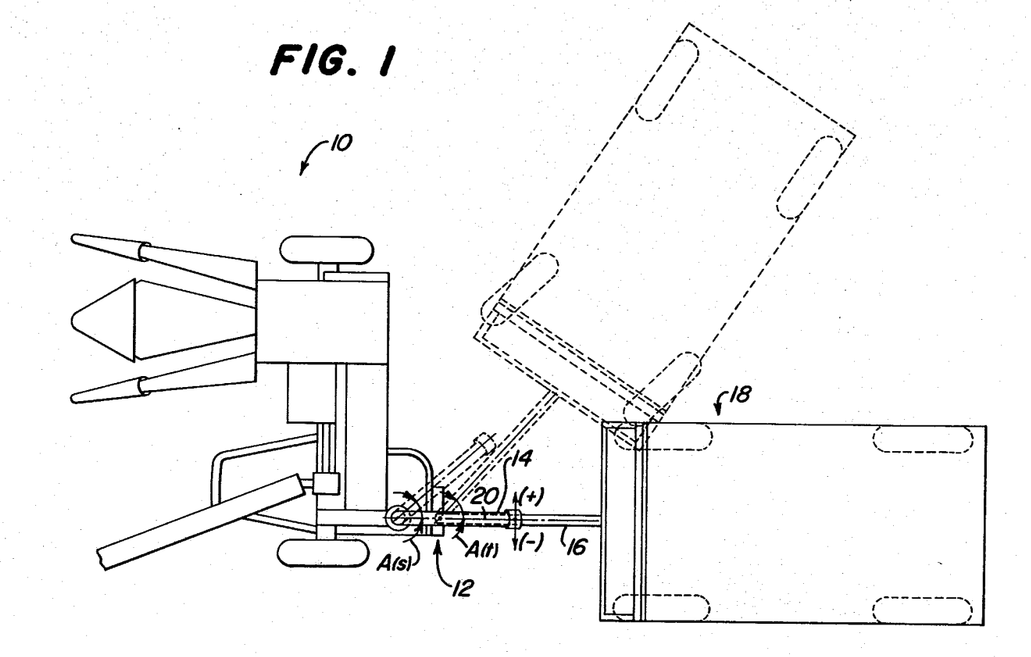
FIG. 1 is an illustration depicting a typical agricultural machine such as a forage harvester, with a crop-receiving wagon pivotally attached thereto.

As seen in FIG. 1, a tractor-drawn forage harvester 10, or a self-propelled forage harvester (not shown), includes a drawbar 12 and a rotatable forage dispensing spout 14. The tongue 16 of a wagon 18, such as a 4-wheel wagon as shown or a 2-wheel wagon (not shown), is hitched to the drawbar 12 so that the wagon 18 receives the material discharged from the spout 14. A spout angle A(s) is defined as the relative angle between the spout 14 and the fore-and-aft axis 20 of the harvester 10. A tongue angle A(t) is defined as the relative angle between the wagon tongue 16 and the axis 20.

Figure 2:
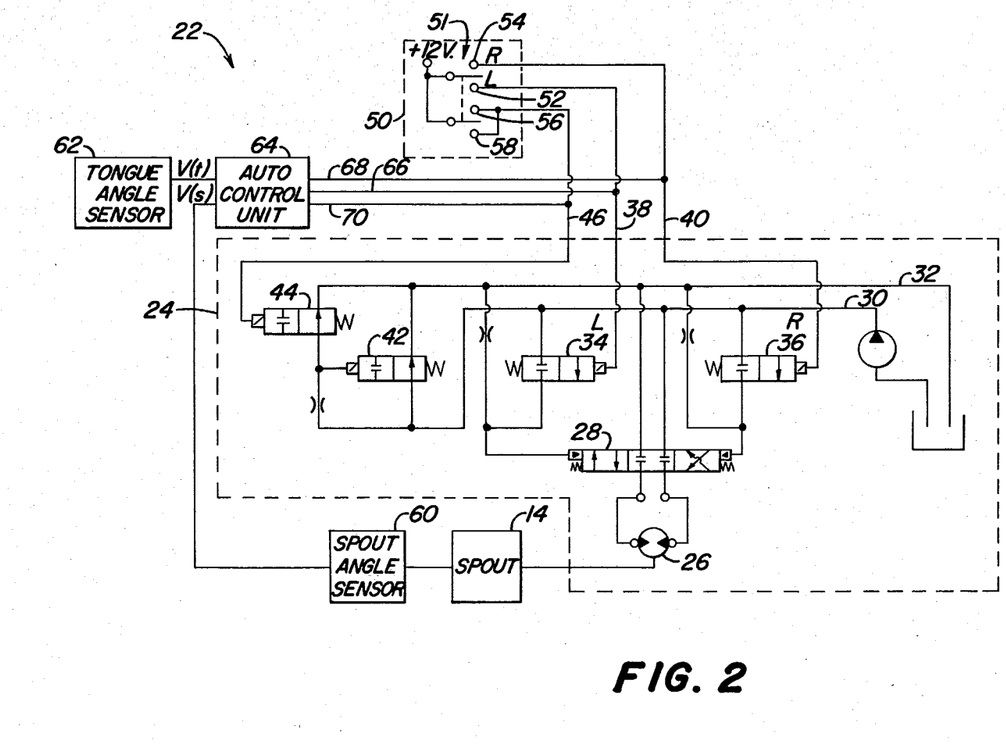
FIG. 2 is a simplified schematic representation of the applicants' control system including the automatic control unit.

A control system 22, schematically shown in FIG. 2, controls the position of the spout 14, either automatically or manually in response to control signals applied to a conventional electrohydraulic circuit 24. Circuit 24 includes a conventional bidirectional fluid motor 26 for rotating the spout 14 either left or right, viewing FIG. 1, in response to fluid received from pilot-operated directional control valve 28, connected to a pump-fed pressure line 30 and a tank line 32. Left and right solenoid-operated pilot valves 34 and 36 operate the directional control valve 28 in response to control signals applied to left and right control lines 38 and 40, respectively. For operating with an open-center hydraulic system (not shown), circuit 24 includes an optional pilot-operated bypass valve 42 controlled by solenoid-operated valve 44 which receives control signals via control line 46. It should be noted that it is within the scope of this invention to substitute an electric powered motor for the hydraulic motor 26 and an electric control circuit for the hydraulic circuit 24.

A manual directional control switch module 50 includes a double pole, double throw momentary-type switch 51 with one side of both poles connected to the +12 volt terminal of the vehicle battery or power supply. Left and right switch contacts 52 and 54 are connected to left and right input or control lines 38 and 40, respectively. Optional open center contacts 56 and 58 are both connected to control line 46 so that valve 44 is actuated to close bypass valve 42 whenever switch 51 is in contact with contacts 52 or 54.

Control system 22 also includes a spout angle sensor 60 and a tongue angle sensor 62, both or which may consist of conventional rotary potentiometers connected to generate voltages V(s) and V(t) indicative of the spout angle A(s) and the tongue angle A(t). The spout angle voltage V(s) generated by spout angle sensor 60 may be considered to be the feedback signal for the automatic control circuit 64. An automatic control circuit 64 generates left and right control signals in output lines 66 and 68 and in output line 70, as a function of the tongue and spout angles. Output lines 66, 68 and 78 are connected to control lines 38, 40, and 46, respectively.

Figure 3A:
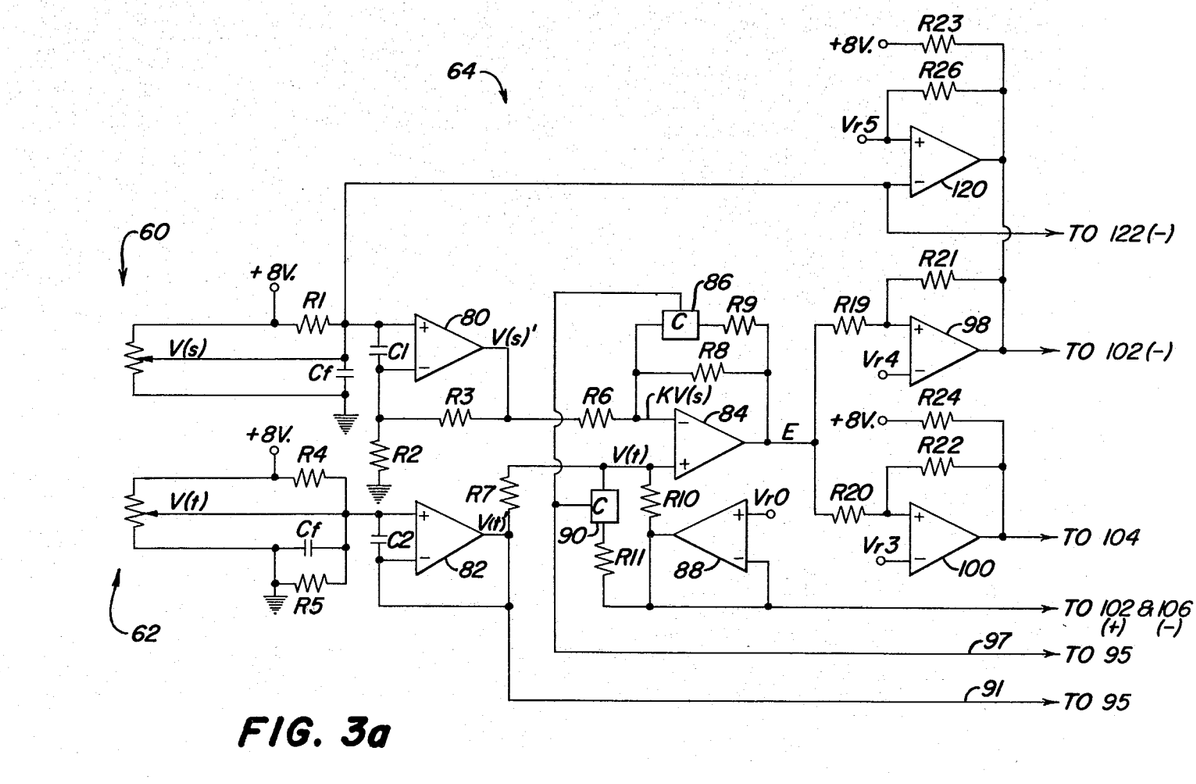
FIGS. 3a and 3b are detailed circuit schematics of the automatic control unit shown in FIG. 2.
Figure 3B:
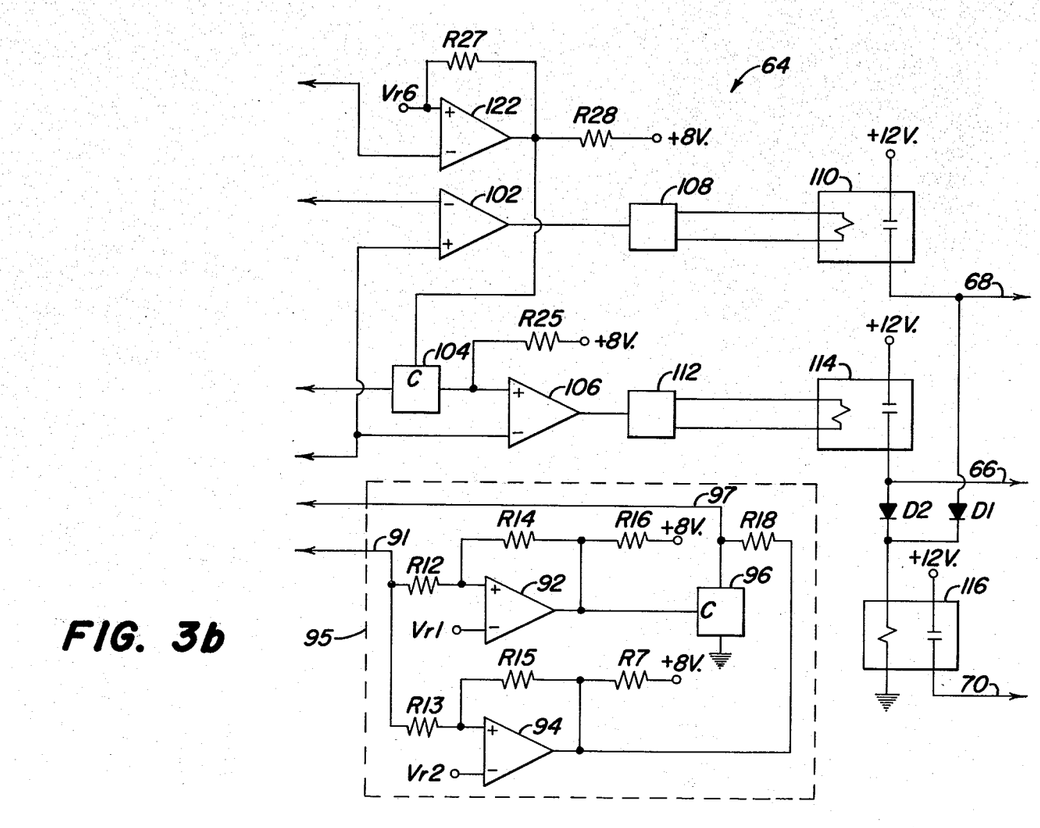

Referring now to FIG. 3, the spout and tongue angle sensors 60 and 62 each include resistances coupled between +8 volts, for example, and ground. The tap terminals of sensor 60 are coupled to +8 volts via resistor R1 and to the (+) input of buffer amplifier 80 with gain K=1.18.

The voltage V(s) representing the spout angle A(s) is multiplied by the gain factor 1.18 in order to compensate for the fact that the pivot point of the spout 14 is positioned forward of the pivot point of the tongue 16 which means that in order to adequately follow the wagon 18, the spout 14 need be swung through an angle of only approximately 85% (1/1.18) of the angle through which the wagon 18 is swung. Of course, exact value of the gain factor K depends on the relative spout and tongue lengths and the separation between their pivot points. The (−) input of amp 80 is coupled to its (+) input via filter capacitor C1, to ground via resistor R2, and to its output via resistor R3. The tap terminal of sensor 62 is coupled to +8 volts via resistor R4, to the (+) input of unity gain buffer amplifier 82, and to ground via resistor R5. The (−) input of buffer 82 is coupled to its output and to its (+) input via filter capacitor C2. Ferrite beads (not shown) may be inserted over the conductors between the sensors 60 and 62 and the corresponding buffer amps 80 and 82 for protection against RF interference. It may also be desirable to couple additional filter capacitors, Cf, (some of which are shown) between these conductors and ground for further RF interference protection.

By way of example, sensors 60 and 62 are adjusted so that when the spout 14 and tongue 16 are parallel to the fore-and-aft axis of the forage harvester 10, (A(s)=A(t)=0°), then the voltage Vs' and Vt' at the outputs of buffer amps 80 and 82, respectively, are both equal to 3.5 volts. Voltage levels greater than 3.5 volts correspond to the situation when the spout 14 and the tongue 16 are to the right of the axis 20, as seen in FIG. 1, wherein angles A(s) and A(t) are defined for purposes of description as positive angles. Conversely, voltages of less than 3.5 volts correspond to negative angles A(s) and A(t) wherein the spout 14 and tongue 16 are to the left of axis 20, viewing FIG. 1. The particular voltage level of 3.5 volts is merely exemplary, however, a non-zero median voltage is chosen to avoid the necessity of a bi-polar voltage supply.

The outputs of buffers 80 and 82 are coupled to the (−) and (+) inputs of differential amplifier 84 via identical resistors R6 and R7, respectively. A resistor and switch network consisting of resistors R8 and R9 and CMOS switch 86 are connected between the (−) input and the output of amp 84. The (+) input of amp 84 is coupled to an output of unity gain buffer amplifier 88 via resistor R10 coupled in parallel with CMOS switch 90 and resistor R11. A reference voltage VrO is applied to the (+) input of unity gain buffer amplifier 88. The (−) input of buffer 88 is coupled to its output. Thus, differential amplifier 84 generates an error voltage E=A(V(t)−K V(s))+3.5 at its output, where A is the gain factor which depends upon the state of switches 86 and 90. For example, A=1.67 when both switch 86 and 90 are closed, and A=10 when both switches 86 and 90 are open. In any case, when the tongue angle A(t)=1.18 A(s), then the error voltage E=3.5 volts.

The buffered tongue angle voltage V(t) from the output of buffer 82 is coupled to the (+) inputs of level comparators 92 and 94 of a gain control or bi-stable or switching circuit 95 via conductor 91 and identical resistors R12 and R13. The outputs of comparators 92 and 94 are each coupled to their inputs via identical resistors R14 and R15 and to +8 volts via identical resistors R16 and R17. The (−) input of comparator 92 is coupled to receive a reference voltage Vr1=3.73 volts and the (−) input of comparator 94 is coupled to receive a reference voltage Vr2=3.23 volts. The output of comparator 92 is coupled to the control input C of CMOS switch 96 which includes a grounded terminal and an ungrounded terminal connected to the output of comparator 94 via resistor R18 and to the control inputs (C) of CMOS switches 86 and 90 via line 97.

The error voltage E from the output of differential amplifier 84 is coupled to the (+) inputs of error comparators 98 and 100 via identical resistors R19 and R20. A reference voltage Vr3=3.02 volts is applied to the (−) input of comparator 100, while a reference voltage Vr4=4.06 volts is applied to the (−) input of comparator 98. The outputs of comparators 98 and 100 are coupled to their (+) inputs via identical resistors R21 and R22 and to +8 volts via identical resistors R23 and R24.

The output of comparator 98 is also coupled to the (−) input of an inverter 102. The output of comparator 100 is coupled via normally closed CMOS switch 104 to the (+) input of buffer amplifier 106 and to +8 volts via resistor R25. Comparators 98 and 100 operate as bi-stable or switching devices having high or low level outputs depending upon the state of their inputs. The (−) input of buffer 88 is connected to the (+) input of invertor 102 and to the (−) input of buffer amplifier 106.

The output of invertor 102 is coupled to a relay driver 108 which controls relay 110 which opens and closes to connect +12 volts with output line 68 and with the anode of diode D1. The output of buffer 106 is connected to a relay driver 112 for controlling relay 114 which opens and closes to connect +12 volts with output line 66 and with the anode of diode D2. The cathodes of diodes D1 and D2 are connected to control relay 116 which connects +12 volts with output line 70. Thus, relay 116 is closed whenever either or both of relays 110 or 114 are closed.

The tap terminal of sensor 60 is also connected to the (−) inputs of comparators 120 and 122. A reference voltage Vr5=5.34 volts is applied to the (+) input of comparator 120, and a reference voltage Vr6=6.28 volts. The output of both comparators 120 and 122 is coupled to their respective inputs via identical resistors R26 and R27. The output of comparator 120 is also coupled to the (−) input of invertor 102. The output of comparator 122 is coupled to +8 volts via resistor R28 and to the control input (C) of CMOS switch 104.

MODE OF OPERATION

The invention operates generally as follows:

When the spout 14 and tongue 16 are not in parallel alignment, such as when the tongue 16 is to the right of the spout 14, viewing FIG. 1, then the tongue angle A(t) will increase with respect to the spout angle A(s), thus causing the error voltage E at the output of differential amplifier 84 to increase from its normal value of 3.5 volts. This increased error voltage E causes the normally low output of level comparator 98 to go high, which, through invertor 102 and relay driver 108, closes relay 110 and energizes output line 68. The energization of output line 68 opens pilot valve 36 which actuates directional control valve 28 to feed fluid pressure to fluid motor 26 to rotate spout 14 to the right or counterclockwise, viewing FIG. 1, until the spout angle A(s) is 0.85 times the tongue angle A(t). As the spout 14 returns to this proper angular relationship to the tongue 16, the error voltage E decreases, the output of level comparator 98 returns to its normally low level, opening relay 110 de-energizing output line 68, closing directional control valve 28 and preventing further motion of spout 14 to thereby maintain alignment between the spout 14 and the tongue 16 until the tongue moves again. Similarly, when the tongue 16 is to the left of the spout 14, then the error voltage E will be reduced from its neutral 3.5 volt level. This decreased error voltage E will cause the normally high output of level comparator 100 to go low, thus closing relay 114 via normally closed switch 104, buffer 106 and relay driver 112. The closing of relay 114 energizes output line 66, opens pilot valve 34 and actuates control valve 28 to feed fluid pressure to motor 26 to rotate spout 14 to the left or clockwise, viewing FIG. 1, to return spout 14 to the proper angular relationship with the tongue 16. At this point, the error voltage will have increased sufficiently to cause the output of level comparator 100 to return to its normally high level, thus opening relay 114 and preventing further movement of the spout 14.

Note that either level comparator 98 or 100 will change state to trigger a correction in the spout position when the magnitude of the angular difference between the tongue angle A(t) and 1.18 times the spout angle A(s) reaches a maximum misalignment angle, MA(max). Then, either level comparator 98 or 100 will change back to its original state to prevent further correction of the spout position when the magnitude of the spout-tongue angular difference has been reduced to a minimum misalignment angle, MA(min). The particular values of these misalignent angles MA(max) and MA(min) are controlled by the levels of reference voltages Vr4 and Vr3, the inherent hysteresis of level comparators 98 and 100, and by the magnitude of the gain A of differential amplifier 84. For example, with a low gain of A equal to approximately 1.67, MA(max) equals 18° and MA(min) equals 2°. This means that no spout position correction will take place until the spout-tongue angle difference exceeds 18°, whereupon the spout position is then corrected to within 2° of the tongue 16. With a high gain of A equal to approximately 10, then MA(max) is equal to 3° and MA(min) is equal to ⅓°. Thus, the amount of allowed free play or misalignment between the spout 14 and the tongue 16 can be varied by changing the gain A of differential amplifier 84.

More specifically, the gain A of differential amplifier 84 is controlled by the tongue angle A(t) through the operation of gain control or bi-stable or switching circuit 95 and CMOS switches 86 and 90. For example, when the tongue angle A(t)=0°, then a voltage V(t)=3.5 volts is applied to the (+) inputs of comparators 92 and 94. Thus, the output of comparator 92 is low, the output of comparator 94 is high, switch 96 is open, the voltage on line 97 is high, both switches 86 and 90 are closed, and differential amplifier 84 has a relatively low gain of A=1.67, for example. With this relatively low gain, the control system operates in a low sensitivity mode. For example, the error voltage E will not change the status of level comparators 98 or 100 until the spout 14 and the tongue 16 are misaligned by at least 18°. This allows the operator to manually swing the spout back and forth with respect to the wagon 18 to obtain uniform wagon filling during the normal straight line travel without de-activation of the automatic control circuit 64. However, if the spout 14 and tongue 16 become misaligned by more than 18° during this low tongue angle condition, then either level comparator 98 or 100 will change state and the spout 14 will be rotated until the spout 14 is aligned to within 2° of the tongue 16, as described earlier, at which point either level comparator 98 or 100 switches back to its original state to prevent further rotation of the tongue 16. The maximum permissible spout-wagon misalignment (18° in this case) may be varied, depending on the width of the crop-receiving wagon 18 and the length of the wagon tongue 16.

Now assume that the tongue angle has increased to +11° or greater. At this point, the output of comparator 94 remains high, but the output of comparator 92 goes high, closing CMOS switch 96, grounding line 97 and opening both switches 86 and 90 and increasing the gain A of differential amplifier 84 to A=10. With this high gain value, the control system operates in a high sensitive mode. For example, either level comparator 98 or 100 changes state to correct the spout position in response to an error voltage E which represents a spout-tongue misalignment or MA(max) of only 3°. Then, either level comparator 98 or 100 switches back to its original state after the spout-tongue misalignment has been corrected to a MA(min) of ⅓°. In this manner, the relative angle between the spout 14 and the tongue 16 is maintained between a 3° maximum and a ⅓° minimum when the tongue angle A(t) is relatively large, such as when forage harvester 10 is executing turns. This is desirable because level wagon filling is not necessary during the relatively short time period in which the operator is busy steering the forage harvester 10 and wagon 18 through a turn. Thus, the gain A of differential amplifier 84 is changed to vary the amount of permitted spout-tongue misalignment, depending upon the relative angle between the wagon tongue 16 and the forage harvester drawbar 12. The maximum permissible spout-wagon misalignment during this high gain operational mode is chosen according to the wagon width and tongue length to prevent crop spillage when the forage harvester 10 and wagon 18 are executing turns.

In short, the applicants' invention can be described as a variable sensitivity automatic feedback control system which controls the spout position as a function of the difference between the spout-machine and wagon-machine angles. The control system sensitivity depends upon the gain A of differential amplifier 84, which, in turn, depends upon the wagon-machine angle. Furthermore, while the applicants' control system permits the spout-wagon misalignment to reach thresholds of at least 18° or 3° (depending upon which gain mode the system is in), once these thresholds are exceeded, then the control system operates to reduce the spout-wagon misalignment down to the much smaller levels of 2° and ⅓°, respectively. This result is possible because the maximum misalignment levels are not achieved through the use of idlers which would reduce the sensitivity of the angle sensors 60 and 62. Instead, this disparity in the maximum and minimum misalignments is produced electronically by the hysteresis in the level comparators 98 and 100.

Now, when the harvester 10 and wagon 18 are coming out of a turn, the tongue angle A(t) will be decreasing as the wagon 18 straightens out behind the harvester 10. When the tongue angle A(t) decreases to 4° or lower, then comparator 92 or gain control circuit 95 turns back off, opening switch 96 and raising the voltage on line 97 under the influence of comparator 94, whose output is still high. This re-closes switches 96 and 90 and returns differential amplifier 84 to the low gain (A=1.67), low sensitivity condition described previously wherein tongue-spout misalignment is maintained between 18° and 2°. The particular tongue angles A(t) at which comparator 92 changes state to control the gain A of differential amplifier 84 is due to the level of reference voltage Vr1 and the inherent hysteresis of comparator 92.

The applicants' invention operates in a like manner when the tongue 16 is to the left of the axis 20, viewing FIG. 1, wherein the voltage V(t) represents negative tongue angles A(t). In this case, however, when the tongue angle A(t) changes from 0° to −11°, then the output of comparator 94 of gain control circuit 95 goes from high to low, thus producing a low voltage at line 97, regardless of the condition of comparator 92. This closes switches 86 and 90 and changes the gain A of differential amplifier 84 from low to high, and converts the control system from its low sensitivity mode to its high sensitivity mode. Furthermore, as the tongue angle A(t) changes from −11° back to −4°, then the output of comparator 94 switches back from low to high to return the differential amplifier 84 to its low gain and low sensitivity condition previously described. The particular negative tongue angle A(t) at which comparator 94 changes states is due to the level of reference voltage Vr2 and the inherent hysteresis of the comparator 94. In this manner, the operation of applicants' control system is symmetrical about the fore-and-aft axis 20.

If, due to some type of malfunction, the voltage V(s) at the tap terminal of spout angle sensor 60 increases to the level of reference voltage Vr5, but below the level of reference voltage Vr6 of comparator 122, then the normally high output of comparator 120 switches low. Since this low output level is connected to the (−) input of invertor 102, the output of invertor is maintained high, thus disabling relay driver 108 and relay 110 and preventing energization of output line 68. This prevents automatic actuation of pilot valve 36 and thus prevents fluid motor 26 from rotating the spout 14 counterclockwise under the influence of the automatic control circuit 64. It would still be possible for the operator to manually control the position of spout 14 through the use of control switch module 50. However, in this malfunction condition, the automatic control unit 64 would be constrained to prevent automatic counter-clockwise rotation of the spout 14, viewing FIG. 1, thus creating a predictable malfunction condition.

Note also that if an open circuit condition occurs in the potentiometer of spout angle sensor 60, then the spout angle voltage V(s) at the tap terminal of sensor 60 will be pulled to +8 volts through resistor R1. This open circuit tap voltage V(s) will cause the normally high output of comparator 120 to go low to prevent automatic counterclockwise rotation of the spout 14, as just described. This open circuit tap voltage V(s) will also cause the normally high output of comparator 122 to go low, thus opening normally closed switch 104. With switch 104 open, the output of buffer 106 will remain high, thus disabling relay driver 112 and relay 114 to maintain output line 66 de-energized. De-energized line 66 prevents automatic clockwise rotation of the spout 14. Thus, in this open circuit sensor situation, the automatic control circuit 64 is totally disabled, giving the operator complete control of the spout position via control switch module 50 and preventing undesired automatic or extreme spout motion.

Note that each relay 110 and 114 includes one terminal permanently and continuously connected to the input lines 40 and 38 via output lines 68 and 66, respectively, and that there is no switch to disconnect the automatic control unit 64 from the pilot valves 34 and 36 of electrohydraulic circuit 24. Thus, the operator need not actuate any switch to operatively connect the automatic control unit 64 with pilot valves 34 and 36 after he is finished with a manual control sequence. Similarly, the terminals of manual directional control switch module 50 are also permanently and continuously connected to input lines 40 and 38, so that to manually control the spout 14, the operator need only actuate switch module 50. Thus, the operation of this control system is simplified by the absence of a manual-automatic mode selecting switch, such as that which is interposed between the spout drive motor and the relays and the manual control switch in the control system described in U.S. Pat. No. 4,042,132.

It should be noted that the particular numerical values presented in this description are merely exemplary and should not be construed as limiting the scope of the invention.

We claim:

1. In an automatic control system for maintaining a predetermined spout-wagon angular relationship in an apparatus comprising a crop discharge spout on an agricultural machine and a crop-receiving wagon pivotally attached to the machine, the improvement comprising:

means for automatically maintaining the spout-wagon angular relationship within a first angular range for each wagon-machine angle of one range of wagon-machine angles; and means for automatically maintaining the spout-wagon angular relationship within a second angular range for each wagon-machine angle of another range of wagon-machine angles.

2. The invention of claim 1, wherein:

the first angular range is large enough to permit an operator to manually adjust the spout position to achieve even filling of the wagon during substantially straight-line travel without causing actuation of the automatic control system; and the second angular range is small enough to prevent crop spillage when the machine and wagon are executing a turn.

3. The control system of claim 1, further comprising a spout-wagon angle sensor and means for automatically partially disabling the automatic control system to prevent rotation of the spout in a predetermined direction in response to a sensed malfunction condition of the spout-wagon angle sensor.

4. The control system of claim 1, further comprising a spout-wagon angle sensor and means foer automatically totally disabling the automatic control system to prevent rotation of the spout in any direction in response to a sensed malfunction condition of the spout-wagon angle sensor.

5. In an automatic control system for maintaining a predetermined spout-wagon angular relationship in an apparatus comprising a crop discharge spout on an agricultural machine and a crop-receiving wagon pivotally attached to the machine, the improvement comprising:
   means for automatically maintaining the spout-wagon angular relationship within a first angular range for each wagon-machine angle during normal straight line travel of the machine and wagon; and
   means for automatically maintaining the spout-wagon angular relationship within a second angular range which is smaller than the first angular range for each wagon-machine angle during turning travel of the machine and wagon.

6. An automatic control system for controlling the position of a crop discharge spout on an agricultural machine having a crop-receiving wagon pivotally attached thereto, comprising:
   means for sensing a spout-machine angle and for generating a first signal indicative thereof;
   means for sensing a wagon-machine angle and for generating a second signal indicative thereof;
   variable gain differential amplifier means for generating an error signal representing a difference between the first and second signals multiplied by the gain thereof;
   means for adjusting the gain of the differential amplifier means in response to changes in the second signal; and
   means for repositioning the spout in response to the error signal to thereby reduce the magnitude of the error signal.

7. The invention of claim 6, further comprising: means for partially disabling the control system when the first signal exceeds a first threshold level.

8. The invention of claim 7, further comprising: means for totally disabling the automatic control system when the first signal exceeds a second threshold level.

9. The invention of claim 6, wherein the gain adjusting means comprises:
   bi-stable means for switching from a first state to a second state when the second signal increases to a first limit level and for switching from the second state to its first state when the second signal decreases to a second limit level smaller than the first limit level, and means for controlling the gain of the variable gain differential amplifier depending upon the state of the bi-stable means.

10. The invention of claim 6, further comprising:
    bi-stable means coupled between the differential amplifier means and the repositioning means for switching from a first state to a second state when the error signal increases to a first threshold level and for switching from the second state to its first state when the error signal decreases to a second threshold level, the repositioning means operating to move the spout to reduce the magnitude of the error signal only when the bi-stable means is in its second state.

11. The invention of claim 10, wherein:
    the first threshold level represents a first magnitude of angular spout-wagon misalignment and the second threshold level represents a second magnitude of spout-wagon misalignment, the first magnitude being greater than the second magnitude.

12. An automatic control system for controlling the position of a crop discharge spout on an agricultural machine having a crop-receiving wagon pivotally attached thereto, comprising:
    means for sensing a spout-machine angle and for generating a first signal indicative thereof;
    means for sensing a wagon-machine angle and for generating a second signal indicative thereof;
    differential amplifier means for generating an error signal representing a difference between the first and second signals;
    bi-stable means for switching from a first state to a second state when the error signal increases to a first threshold level and for switching from the second state to its first state when the error signal decreases to a second threshold level; and
    means coupled between the spout and the bi-stable means for moving the spout to reduce the magnitude of the error signal only when the bi-stable means is in its second state.

13. The invention of claim 12, wherein:
    the differential amplifier means comprises a variable gain differential amplifier, the control system further comprising means for adjusting the amplifier gain in response to changes in the second signal so that sensitivity of the control system depends upon the wagon-machine angle.

14. The invention of claim 12, wherein:
    the first threshold level represents a first magnitude of angular spout-wagon misalignment and the second threshold level represents a second magnitude of spout-wagon misalignment, the first magnitude being greater than the second magnitude.

15. An automatic control system for controlling the position of a crop discharge spout on an agricultural machine having a crop-receiving wagon pivotally attached thereto, the control system comprising:
    a spout-machine angle sensor for sensing a spout-machine angle;
    a wagon-machine angle sensor for sensing a wagon-machine angle, the wagon-machine angle sensor being coupled between the wagon and the machine without an idler;
    a variable sensitivity feedback control circuit for controlling the spout position as a function of the sensed spout-machine angle and of the sensed wagon-machine angle; and
    means for adjusting the sensitivity of the control system in response to changes in the sensed wagon-machine angle.

16. The invention of claim 15, wherein:
    the variable sensitivity control circuit comprises a differential amplifier having high and low gain conditions for generating an error signal derived by multiplying a difference between the wagon-machine and spout-machine angles by the variable gain, the sensitivity of the control system depending upon the value of the gain, and means for moving the spout in response to the error signal to reduce the magnitude of the error signal; and
    the sensitivity adjusting means comprising bi-stable means for switching from a first state to a second state when the magnitude of the wagon-machine angle increases to a first threshold level and for switching from the second to the first state when the magnitude of the wagon-machine angle decreases to a second threshold level, smaller than the first threshold level, and means for switching the differential amplifier to its low gain condition when the bi-stable means is in the first state and for switching the differential amplifier to its high gain condition when the bi-stable means is in the second state.

17. A control system for controlling the position of a crop discharge spout on an agricultural machine having a crop-receiving wagon pivotally attached thereto, the control system comprising:
- an automatic control circuit for generating spout position control signals as a function of a spout-machine angle and of a wagon-machine angle;
- actuation means for moving the spout in response to energization of an input line connected to the actuation means;
- a manually operated switch comprising at least one terminal permanently and continuously connected to the input line, at least one further terminal connected to a potential source and means for providing continuity between the terminals to energize the input line in response to an operator input signal; and
- a relay comprising at least one terminal permanently and continuously connected to the input line, at least one further terminal connected to the potential source and means for coupling these relay terminals together to energize the input line in response to the control signals generated by the automatic control circuit.

18. An automatic control system for controlling the position of a crop discharge spout rotatable on an agricultural machine having a crop-receiving wagon pivotally attached thereto, comprising:
- means for sensing a spout-machine angle and for generating a first signal indicative thereof;
- means for sensing a wagon-machine angle and for generating a second signal indicative thereof;
- variable gain differential amplifier means for generating an error signal representing a difference between the first and second signals multiplied by the gain thereof;
- means responsive to the second signal for adjusting the gain of the variable gain differential amplifier means, comprising first bi-stable means for switching from a first state to a second state when the second signal increases to a first limit level and for switching from the second state to its first state when the second signal decreases to a second limit level smaller than the first limit level, and means for controlling the gain of the variable gain differential amplifier depending upon the state of the first bi-stable means;
- second bi-stable means for switching from a first state to a second state when the error signal increases to a first threshold level and for switching from the second state to its first state when the error signal decreases to a second threshold level; and
- means for repositioning the spout to reduce the magnitude of the error signal only when the second bi-stable means is in its second state.

19. In a control system for maintaining a predetermined spout-wagon angular relationship in an apparatus comprising a crop discharge spout on an agricultural machine and a crop-receiving wagon pivotally attached to the machine, the improvement comprising:
- an automatic controller comprising means for automatically maintaining the spout-wagon angular relationship within a first angular range during one range of wagon-machine angles and for automatically maintaining the spout-wagon angular relationship within a second angular range during another range of wagon-machine angles; and
- manual means manually operable to vary the spout-wagon angular relationship within the first angular range to achieve even wagon filling without disablement of the automatic controller.

* * * * *